Jan. 6, 1948.    J. M. TYRNER    2,434,131
CURRENT REGULATION FOR ALTERNATING CURRENT ARC WELDING
Filed Sept. 6, 1946
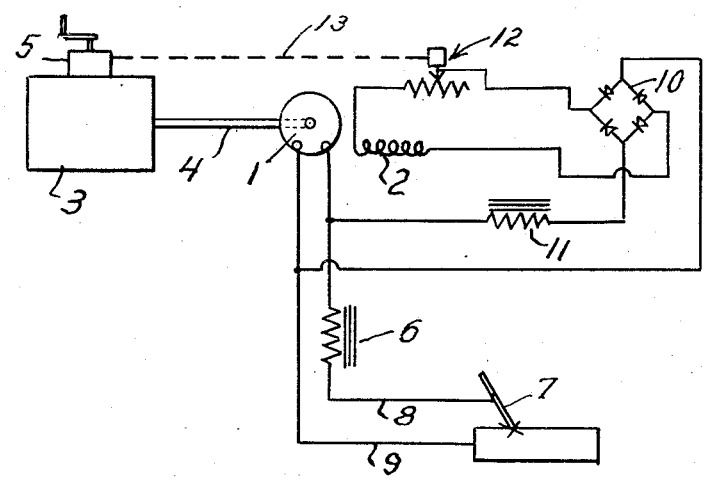
INVENTOR
Joseph M. Tyrner
BY
Pennie Edmonds Morton & Barrows
ATTORNEYS

UNITED STATES PATENT OFFICE 2,434,131

CURRENT REGULATION FOR ALTERNATING CURRENT ARC WELDING

Joseph M. Tyrner, New York, N. Y., assignor to Air Reduction Company, Incorporated, a corporation of New York Application September 6, 1946, Serial No. 695,202

10 Claims. (Cl. 315—291)

This invention relates to alternating current welding apparatus and particularly to a combination welding generator and prime mover therefor of such a nature and so associated with a reactance in the welding circuit that the desired control of the welding current and voltage can be obtained without manipulating any control apparatus in the welding circuit.

In alternating current welding systems employing a constant potential generator it is customary to provide a reactance in series with the arc in order to obtain the desired drooping volt-ampere curve for the welding circuit. In order to control the supply of power to the arc it has been the practice to use a variable reactance in the welding circuit so that by adjusting the reactance the voltage drop across the reactance and hence the current supply for the arc is changed.

The principal object of my invention is to provide a simplified welding system preferably of a portable character whereby the supply of power to the arc can be changed as desired without manipulating any control mechanism in the welding circuit, such as changing the adjustment of a variable reactance in series with the welding arc. In general, my invention contemplates the provision of an alternating current generator supplying current to a welding circuit including a reactance unit which may be either a constant reactance or a variable reactance with what may be regarded as a permanent setting to provide a reactance element of constant inductance. According to my invention the supply of power to the arc may be changed by employing a variable speed drive for the alternating current generator with suitable means for adjusting the speed of the prime mover to change the frequency of the generated voltage. As the generated frequency increases, the voltage drop across the reactance unit increases correspondingly, and, likewise, the voltage drop across the reactance may be decreased by reducing the speed of the generator. The prime mover is preferably directly connected to the generator so as to provide a compact installation which is preferably portable and for such application of my invention I prefer to use an internal combustion engine as the prime mover. A welding set of this character may be employed in places where electric power line connections are not available. The apparatus is extremely simple for no control mechanism is required other than a simple speed governor or similar device for adjusting the speed of the prime mover. The use of an alternating current generator is advantageous because no commutator is required and under certain conditions it is extremely desirable to use a welding system which does not have the brush arcing or require the frequent repair and adjustment so characteristic of commutator machines.

I prefer to employ a generator having at least four field poles to provide a generated voltage of initially higher frequency for a given speed than would be provided by a generator having a smaller number of field poles. This makes it possible to use a series reactance of smaller capacity than would otherwise be required.

An important feature of my invention is the provision of means for automatically controlling the field of the generator to maintain the desired value of generated voltage as the speed of the generator is changed to control the power supplied to the arc. The field current may be supplied through a variable resistance and a rectifier connected to a reactance which is in turn connected to the generator armature. The variable resistance is adjusted in proportion to the generator speed. With this arrangement an increase in the generator speed and in the frequency of the generated voltage increases the voltage drop across the reactance connected to the rectifier and the current supplied to the field winding is decreased. As the speed of the generator is reduced, a stronger flux is required in order to maintain the same voltage and where the excitation is supplied through a variable resistance and a rectifier connected in series with a reactance as above described, the current supplied to the field winding increases as the generator speed decreases, because the decrease in speed is accompanied by a decrease in the variable resistance and in the frequency of the generated voltage.

The various objects and advantages of my invention will be more apparent upon considering the following detailed description of an illustrative embodiment of my invention diagrammatically illustrated in the single figure of the accompanying drawing. The system shown in the drawing comprises an alternating current generator having an armature 1 and a field 2. The generator is driven by a suitable prime mover, preferably an internal combustion engine 3 which may be connected directly to the generator as indicated at 4. The prime mover 3 is equipped with a suitable speed governor or regulator 5 so that the speed of the prime mover and therefore the speed of the generator can be changed as desired by merely changing the setting or adjustment of this speed regulating device.

The generator armature 1 is shown connected to a welding circuit including a reactance 6 in series with an electrode 7, the welding circuit including the usual electrical connections 8 and 9. The reactance 6 provides the desired drooping volt-ampere characteristic for the welding circuit even though the generator may be of the constant potential type. The amount of current supplied to the arc depends upon the impedance of the arc and the impedance of the reactance element. The impedance of the reactance element depends on the frequency of the alternating current supply and, accordingly, any change in this frequency will change the amount of current supplied to the welding electrode. My invention utilizes this method of controlling the supply of current and the change in frequency is obtained by changing the speed of the generator. This makes it unnecessary to adjust any control mechanism in the welding circuit and the reactance 6 may be a constant reactance or a variable reactance which may be regarded as having a permanent adjustment which does not require any change during normal operation of the system.

As explained above, a decrease in the generator speed would ordinarily result in a decrease in the generated voltage unless the field flux is increased as the speed decreases. My invention contemplates the use of means for insuring the desired voltage characteristic at the generator terminals throughout the normal range of operation, in spite of the fact that the generator speed is changed in order to change the frequency of the generated voltage. This result is attained by supplying excitation to the generator field 2 through a rectifier 10 and a reactance 11 connected to the armature winding 1, and by employing a variable resistance 12 actuated by the speed governor 5 as indicated by the dotted line 13 representing a driving connection between the governor 5 and the adjustable contact of the variable resistance 12. The reactance 11, rectifier 10 and variable resistance 12 are preferably of such capacity with respect to the generator characteristics that the field excitation is automatically changed to the extent necessary to maintain the generated voltage at a substantially constant value. As the generator speed is increased to increase the frequency of the generated voltage the variable resistance 12 is also increased and the voltage drop across the reactance 11 connected to the rectifier 10 is increased, and the supply of current to the field winding 2 is decreased. Likewise, when the variable speed drive for the generator is adjusted to decrease the generator speed and to decrease the variable resistance 12 the voltage drop across the reactance 11 is decreased, and the supply of current to the field winding increased. The excitation of the field winding is changed in approximately inverse ratio to the change in the frequency of the generated voltage.

In general, it will be understood that my invention includes improved alternating current welding apparatus, and improved methods of controlling the supply of power to a welding arc by changing the speed of the alternating current generator, the welding current being supplied to the arc through a reactance whereby a change in the generator speed produces a corresponding change in the frequency of the welding current and therefore a change in the voltage drop across the reactance. My invention is not limited to the illustrative embodiment thereof shown in the accompanying drawing but includes such modifications thereof as fall within the scope of the appended claims.

I claim:

1. Alternating current welding apparatus comprising a generator having an armature winding and a field winding, a welding circuit connected to said armature winding, an inductive reactance in said welding circuit, variable speed means for driving said generator whereby the frequency of the generated voltage can be varied by changing the speed of said driving means, and means responsive to the frequency of the generated voltage and to the variable speed means to control the excitation of the field winding.

2. Alternating current welding apparatus comprising a generator having an armature winding and a field winding, a welding circuit connected to said armature winding, an inductive reactance in said welding circuit, variable speed means for driving said generator whereby the generated voltage can be varied by changing the speed of said driving means, and means responsive to the frequency of the generated voltage and to the variable speed means to change the excitation of the field winding in approximately inverse ratio to the frequency of the generated voltage whereby the generated voltage is maintained substantially constant during normal operation.

3. Alternating current welding apparatus comprising a generator having an armature winding and a field winding arranged to provide at least four field poles, a welding circuit connected to said armature winding, an inductive reactance in said welding circuit in series with the arc, and variable speed means for driving said generator whereby the frequency of the generated voltage can be varied to thereby change the voltage drop across said reactance in series with the welding arc.

4. Alternating current welding apparatus comprising a generator having an armature winding and a field winding, a welding circuit connected to said armature winding, a constant inductive reactance element in said welding circuit in series with the welding arc, variable speed means for driving said generator, and means for changing the speed of said driving means whereby the frequency of the generated voltage can be varied to thereby change the voltage drop across said reactance unit.

5. Alternating current welding apparatus comprising a generator having an armature winding and a field winding, a welding circuit connected to said armature winding, a constant inductive reactance connected in said welding circuit in series with the welding arc, variable speed means for driving said generator whereby the frequency of the generated voltage can be varied to change the voltage drop across the reactance, and means responsive to the frequency of the generated voltage and to the variable speed means to change the excitation of the field winding in approximately inverse ratio to the change in frequency of the generated voltage, whereby the generated voltage is maintained substantially constant during normal operation.

6. A portable alternating current welding unit comprising a generator having an armature winding and a field winding, driving means for said generator directly connected thereto, a welding circuit connected to said armature winding, an inductive reactance connected in said welding circuit in series with the welding arc and means for varying the speed of said driving means whereby the frequency of the generated voltage can be varied to thereby change the voltage drop across said reactance.

7. The method of controlling the supply of power from an alternating current generator to a welding arc in series with an inductive reactance, which comprises varying the speed of the generator to change the frequency of the alternating current supplied to the arc through the reactance.

8. The method of controlling the supply of power from an alternating current generator to a welding arc in series with an inductive reactance, which comprises driving the generator by a variable speed prime mover, and changing the speed thereof to change the frequency of the alternating current supplied to the arc through the reactance.

9. The method of controlling the supply of power from an alternating current generator to a welding arc in series with an inductive reactance, which comprises varying the speed of the generator to change the frequency of the alternating current supplied to the arc through the reactance and simultaneously changing the excitation of the generator in approximately inverse ratio to the change in the frequency of the welding current.

10. The method of controlling the supply of power from an alternating current generator to a welding arc in series with an inductive reactance, which comprises varying the speed of the generator to change the frequency of the alternating current supplied to the arc through the reactance, and supplying excitation current to the generator through a variable resistance, a rectifier and a reactance connected to the rectifier and to the generator armature to change the excitation of the generator in approximately inverse ratio to the change in the frequency of the welding current whereby the generated voltage is maintained substantially constant.

JOSEPH M. TYRNER.

REFERENCES CITED

The following references are of record in the file of this patent:

UNITED STATES PATENTS

| Number | Name | Date |
|---|---|---|
| 546,191 | Rice | Sept. 10, 1895 |
| 1,304,240 | Alexanderson | May 20, 1919 |